3,450,585
SURFACE-PROCESSING METHOD FOR
SYNTHETIC RESIN SHEET
Haruo Takagi, Osaka, and Yasuo Yamagishi, Sakai, Japan, assignors to Sakai Kasei Kogyo Kabushiki Kaisha (Sakai Chemical Industry Co., Ltd.), Osaka, Japan
Filed Sept. 28, 1965, Ser. No. 490,824
Claims priority, application Japan, Oct. 28, 1964, 39/61,195
Int. Cl. B29d 27/22
U.S. Cl. 156—242            3 Claims

ABSTRACT OF THE DISCLOSURE

The processing of a synthetic resin sheet including passing a sheet of synthetic resin into the nip defined between heated and cooled rollers while applying a separate synthetic resin to the surface of the sheet facing the heated roller whereby the separate synthetic resin is melted by the roller and caused to adhere to the surface thereof. When the sheet is separated from the heated roller the melted resin is drawn forcibly to the periphery of the heated roller thus producing sticky strings and upon further movement of the sheet the strings separate from the heated roller surface and shrink thereby forming a plurality of projections of indeterminate shape on the entire surface of the sheet.

---

The present invention relates to a method for processing the surface of a synthetic resin sheet which may be either in the form of a thin cloth woven of fine, flat yarns prepared by cutting a synthetic resin film in a longitudinal direction or in the form of a smooth-faced sheet prepared by molding synthetic resin as it leaves an extrusion machine, and more specifically, this invention has for an object to provide a unique method for manufacturing a synthetic resin sheet with either a rough or a furry surface as desired, by producing spiniform, hair-like or other similar projections of indeterminate shape on the originally smooth surface.

While it is common that a synthetic resin sheet as made originally possesses a smooth surface and has been used for a wide variety of applications where such a feature is considered advantageous, the smoothness of the surface was not at times desirable in certain fields of application and it is another object of this invention to manufacture suitable synthetic resin sheets for such end-uses.

Figure 1:
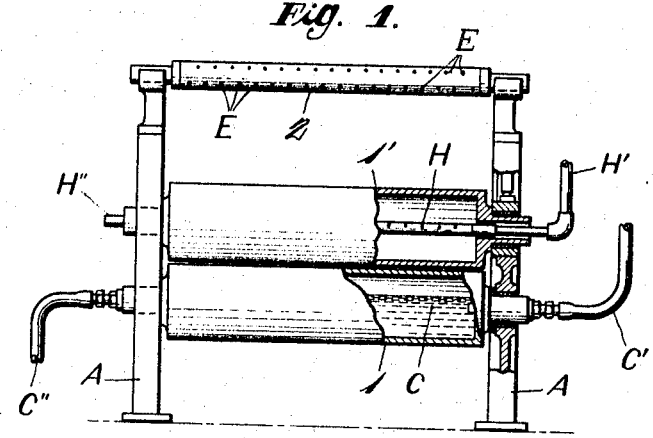
Figure 2:
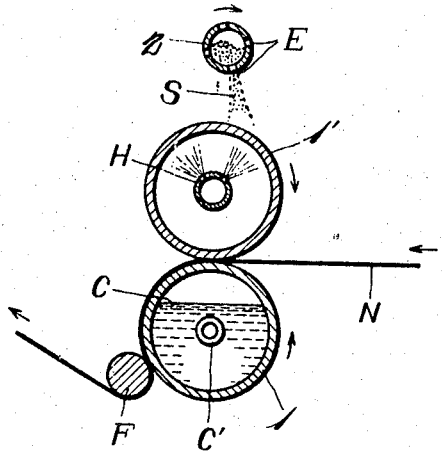
Figure 3:
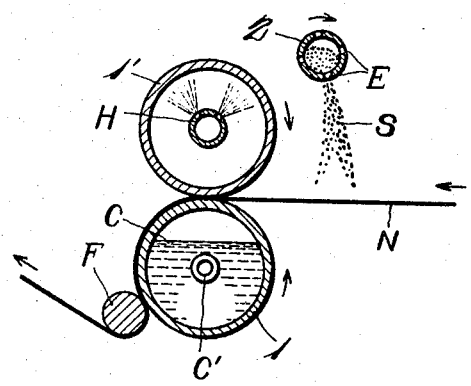
Figure 4:
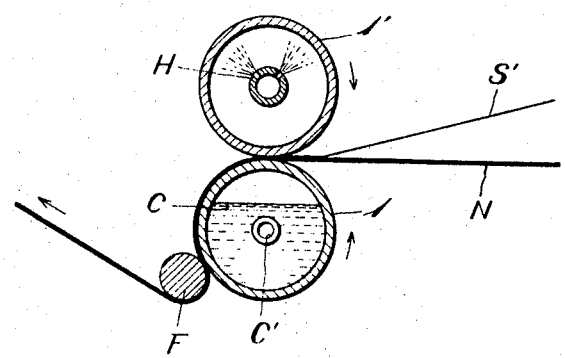
Figure 5:
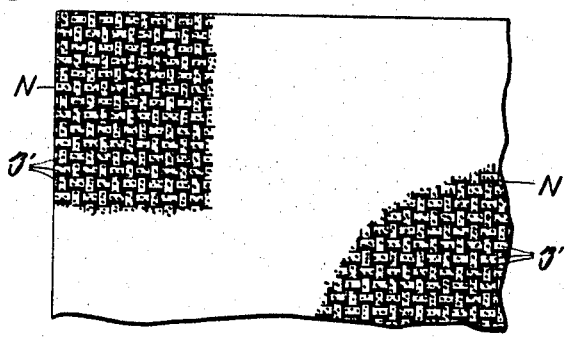
Figure 6:
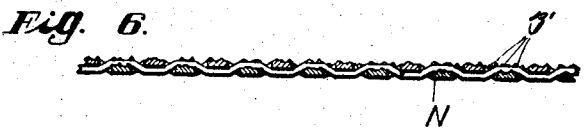
Figure 7:
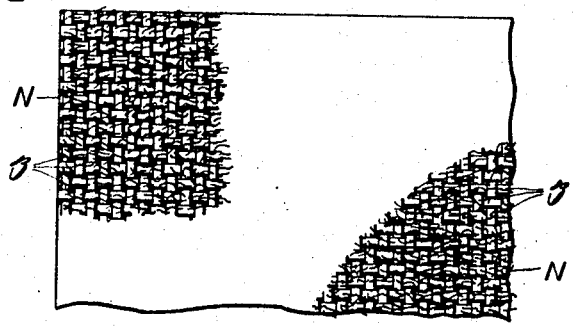
Figure 8:
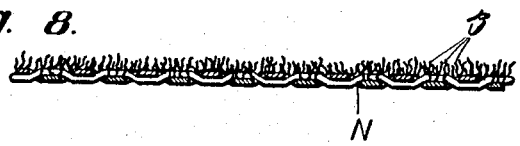

The nature and further advantages of the present invention will be more clearly understood from the following description made in connection with the accompanying drawings in which:

FIG. 1 is a view in front elevation, partly in section, of a mechanical device employed to perform the processing under this invention, FIG. 2 is a side view in vertical cross-section of the mechanical device illustrated in FIG. 1, showing one method for the processing, FIG. 3 is a side view in vertical cross-section of the mechanical device, showing another method for the processing, FIG. 4 is a side view in vertical cross-section of the mechanical device, showing still another method for the processing, in which the synthetic resin is supplied in the form of a resin film, FIG. 5 is a plan view of the synthetic resin sheet processed by the invention, carrying countless spiniform projections on its surface, FIG. 6 is a side view of the processed synthetic resin sheet illustrated in FIG. 5, FIG. 7 is a plan view of the synthetic resin sheet processed by the invention, carrying countless hair-like projections on its surface, and FIG. 8 is a side view of the processed synthetic resin sheet illustrated in FIG. 7.

The method of processing under this invention shall now be described by reference to the accompanying drawings, in which the same index numbers and letters denote the same components.

Referring first to a mechanism employed for processing, a set of drawing rollers comprising a lower roller 1 and an upper roller 1', which rotate in opposite directions as indicated by the arrows in FIG. 2, is disposed horizontally on an appropriate frame A. Also disposed on the frame in parallelism with and immediately above the rollers, is a powder-sprinkling roll 2. While the lower roller 1 is kept cooled at all times by passing cold water C therethrough, the upper roller 1' is kept heated at a high temperature (high enough to melt instantaneously synthetic resin which touches it) at all times by means of a gas burner H provided therein.

Referring to FIG. 1, C' is a cold water intake pipe, and C" is a cold water drain pipe. H' and H" are a gas intake pipe and an exhaust port, respectively.

The powder-sprinkling roll 2 is a cylindrical body having in its peripheral wall a plurality of small holes E, through which the powdered synthetic resin contained in the roll is permitted to fall as the roll rotates.

With the above mechanism in readiness, a material sheet N to be processed, which is either a smoothfaced thin synthetic resin sheet leaving an extrusion machine or a synthetic resin cloth woven of warp and weft threads comprising fine, flat yarns made by cutting a synthetic resin film into long and slender portions, is inserted between the rollers 1 and 1' from one side and is passed slowly between the rollers. At the same time, the powder-sprinkling roll 2 is rotated to allow the powdered synthetic resin contained therein to drop or fall onto the upper surface of the upper roller 1' as shown in FIG. 2. At such time the powdered synthetic resin S melts immediately as it contacts the surface of the upper roller 1' which is kept heated at a high temperature and, as it is spreading, in a molten state on the surface of the roller, it arrives at and adheres to the upper surface of the material sheet N which is passing between the roller 1' and the lower roller 1, and the resin coated sheet passes through between the nip of said rollers as they are being pressed together. The material sheet N thus passed through between the rollers 1 and 1' with the molten resin adhered to its upper surface, separates from the upper roller 1' as soon as it passes through due to the difference in the rotational direction between the upper roller 1' rotating upward and the material per se turning downward by means of an induction roll F. At this time, the molten resin adhering to the upper surface of the material sheet N is drawn forcibly to the surface of the upper roller 1', whereby stringing of the molten resin occurs. These sticky strings then separate from the surface of the roller and shrink, thereupon forming projections of indeterminate shape on the surface of the material for processing. The numerous projections caused by these sticky strings are the very projections on the sheet surface as intended as the final object of this invention. If the material is processed with the supply of a comparatively large amount of synthetic resin powder which is allowed to fall from the powder-sprinkling roll 2 while the upper roll 1' is kept heated to comparatively high temperature, the strings produced by the aforementioned stringy element are drawn out long and slender, with the result that they are formed into hair-like projections 3. On the other hand, if the processing is carried out with the supply of a small amount of synthetic resin powder from the powder-sprinkling roll 2 while the upper roller 1' is kept heated to relatively low temperature, the strings produced by the stringy element are not drawn out but formed into spiniform or similar small projections 3'. Which type of the abovementioned projections is to be produced is a matter which can be decided in consideration of the end-use for the finished product.

Of the processes explained above, the pulverized synthetic resin in the powder-sprinkling roll 2 may be sprinkled directly on the surface of the material sheet rather than on the surface of upper roller 1', as shown in FIG. 3. However in this case as well, the results obtainable are entirely the same as in the case of the operation explained above with reference to FIG. 2, since the material advances with the pulverized synthetic resin deposited on its upper surface until it is caught between the upper and the lower rollers 1' and 1, whereupon the pulverized synthetic resin is instantaneously melted by the high heat of the upper roller 1' and adheres to the surface of the material, with the result that when it passes through the roller and separates from the upper roller, it is formed into sticky strings.

The aforementioned methods for the formation of sticky strings and hence projections are examples of operation in which synthetic resin is supplied in powder form. However, there is another method of resin supply which yields similar results as shown in FIG. 4, and in which the upper surface of a material sheet N is laminated with a synthetic resin film S' of the same width and the laminated sheet material passes through between the aforementioned drawing rollers 1 and 1'. In this case, however, it should be so contrived that the temperature of the upper roller 1' is kept rather high, so as to enable the passing resin film S' to melt thoroughly.

Since the lower roller 1 is constantly kept in a cooled condition, there is no apprehension for the material sheet N to itself melt when passing through the nip between said rollers, even if it may be subjected to the high heat of the upper roller 1'. Moreover, as shown in FIGS. 2–4, where the material, after passing through the nip of the rolls, is kept in close contact with the surface of the cooled roller for a certain distance and duration, cooling and solidification of the work are accelerated considerably.

The synthetic resin sheet processed by the present method carries on its entire surface innumerable spiniform, hair-like, or similar projections of indeterminate shape, and consequently the surface of the sheet is rough (in the case of small spiniform projections 3'), or furry (in the case of hair-like projections 3), with the result that the same may be decoratively used as coverings for walls, furniture, carpeting, handicraft material, etc. Moreover, in the case of the products having thick small spiniform projections 3, if they are formed into packing bags for wool, etc. with the rough side out, the bags thus produced can prevent themselves from slipping down when piled one upon another, with their rough side acting as a check against the collapse of piled-up packs, and therefore, they are particularly efficacious for use as steady cargo loading. Thus, the products under the present invention can be used for very wide ranges of practical application.

What we claim herein is as follows:

1. A method of proccessing a synthetic resin sheet comprising the steps of providing heated and cooled rollers defining a nip therebetween, passing a synthetic resin sheet into the nip while supplying a separate synthetic resin to the surface of the sheet facing the heated roller whereby the separate synthetic resin is melted and caused to adhere to such surface, and guiding the sheet after leaving the nip about the cooled roller thereby separating the sheet from the heated roller causing the melted resin to be drawn forcibly to the periphery of the heated roller thus producing sticky strings, with such strings separating from the surface of the heated roller and shrinking, thereby forming a plurality of projections of indeterminate shape on the entire surface of the sheet.

2. The method of processing a synthetic resin sheet as claimed in claim 1 in which said separate synthetic resin is a synthetic resin film.

3. A method of processing a synthetic resin sheet comprising the steps of providing heated and cooled rollers defining a nip therebetween, passing a synthetic resin sheet into the nip while supplying powdered synthetic resin to the surface of the sheet facing the heated roller whereby the powdered synthetic resin is melted and caused to adhere to such surface, and guiding the sheet after leaving the nip about the cooled roller thereby separating the sheet from the heated roller causing the melted resin to be drawn forcibly to the periphery of the heated roller thus producing sticky strings, with such strings separating from the surface of the heated rollers and shrinking, thereby forming a plurality of projections of indeterminate shape on the entire surface of the sheet.

References Cited

UNITED STATES PATENTS

| | | | |
|---|---|---|---|
| 1,999,259 | 4/1935 | Rozema | 156—279 |
| 2,956,917 | 10/1960 | Fasano | 156—321 X |
| 3,075,868 | 1/1963 | Long | 156—282 X |
| 3,196,195 | 7/1965 | Tritsch | 156—242 X |

HAROLD ANSHER, *Primary Examiner.*

U.S. Cl. X.R.

117—9, 21; 156—279, 282, 498; 264—119, 164, 293